Oct. 29, 1968  K. BERZINS  3,407,679
DEFLECTION ROLL DRIVE

Original Filed Aug. 16, 1965

INVENTOR.
Karlis Berzins

BY Hill, Sherman, Meroni, Gross & Simpson

ATTORNEYS

Oct. 29, 1968 K. BERZINS 3,407,679
DEFLECTION ROLL DRIVE
Original Filed Aug. 16, 1965 2 Sheets-Sheet 2

INVENTOR.
Karlis Berzins
BY Hill, Sherman, Meroni, Gross & Simpson ATTORNEYS

United States Patent Office 3,407,679
Patented Oct. 29, 1968

3,407,679
DEFLECTION ROLL DRIVE
Karlis Berzins, Beloit, Wis., assignor to Beloit Corporation, Beloit, Wis., a corporation of Wisconsin
Continuation of application Ser. No. 479,899, Aug. 16, 1965. This application Nov. 13, 1967, Ser. No. 682,674
9 Claims. (Cl. 74—423)

ABSTRACT OF THE DISCLOSURE

Support and drive for controlled deflection roll of the calender type in which the roll is supported on a stationary center shaft on self-aligning bearings. The center shaft extends beyond the ends of the roll and is fixedly supported adjacent its ends. The support for one end of the center shaft comprises a stationary housing extending axially of the roll shell beyond the end of the center shaft and having a support for the shaft mounted therein supporting the shaft inwardly of the outer end of the shaft. Drive gearing journalled on the shaft on opposite sides of the support and a third drive gear journalled on the support and meshing with the drive gearing forms a drive for the roll, driving the roll around the support. A flexible coupling connects the drive gearing to the roll.

---

This application is a continuation of Ser. No. 479,899, filed Aug. 16, 1965, now abandoned.

The present invention relates to improvements in controlled deflection rolls, in which a controlled nip pressure is obtained between a roll couple, and more particularly relates to an improved support and drive for the roll.

A principle object of the present invention is to provide an improved drive for a controlled deflection roll arranged with a view toward utmost compactness and efficiency in construction.

A further object of the invention is to improve upon the drives for controlled deflection rolls heretofore in use, by providing a simplified drive to the roll, extending along the outside of the center shaft for the roll and within the peripheral limits of the roll.

Another object of the invention is to improve upon the supports and drives for controlled deflection rolls by rotatably supporting the roll on its center shaft and supporting the center shaft at its ends and driving the roll around one support for the center shaft by a drive connection within the peripheral limits of the roll.

Still another object of the invention is to provide an improved form of controlled deflection roll having a stationary center shaft carrying the deflection loads on the roll and forming a bearing support for the roll, in which the center shaft is solidly supported adjacent its opposite ends, and a bevel geared drive, within the peripheral confines of the roll, it provided to drive the roll around the support for the center shaft.

These and other objects of the invention will appear from time to time as the following specification proceeds and with reference to the accompanying drawings wherein.

Figure 1:
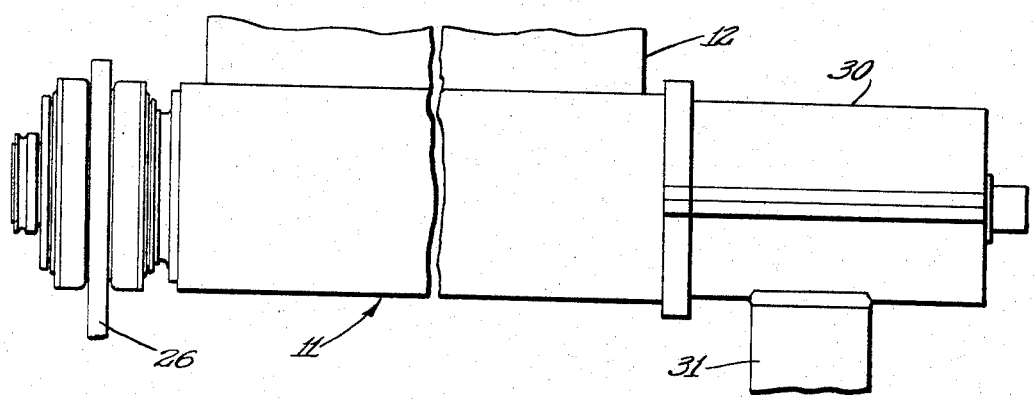
FIGURE 1 is a generally diagrammatic view of a controlled deflection roll supported and driven in accordance with the principles of the present invention, and showing a second roll forming a roll couple with the deflection roll.
Figure 3:
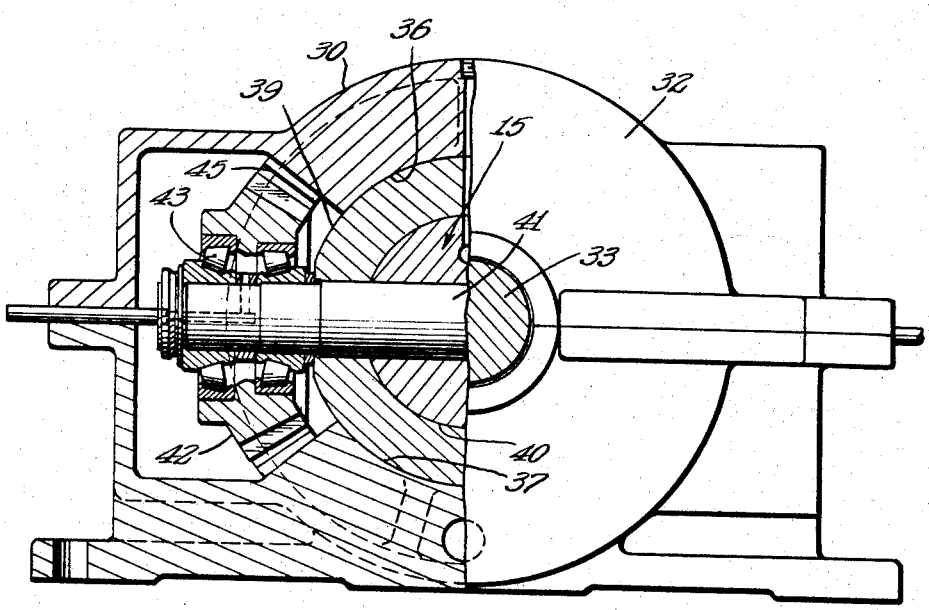
FIGURE 3 is a fragmentary transverse sectional view of one half of the roll and its support, taken substantially along line III—III of FIGURE 1.

In the embodiment of the invention illustrated in the drawings, I have shown in FIGURE 1 a controlled deflection roll assembly 11, which operates in a roll couple with a second roll 12, as in Application Ser. No. 339,998 filed Jan. 24, 1964, now Patent No. 3,276,102, and is particularly adapted to be an intermediate roll of a calender stack, although it may be a crown roll. The roll assembly 11 includes an elongated hollow cylindrical roll shell 13 having an inner stationary core or center shaft 15 extending through the center thereof and beyond opposite ends thereof. The center shaft 15 may be drilled from the ends thereof, to accommodate the passage of fluid pressure lines thereinto, to pressurize a crown controlling pressure shoe 16 and to receive lubricant for lubricating the roll shell bearings. The crown controlling pressure shoe 16 is partially shown in FIGURE 2 and is radially extensible from the periphery of the center shaft 15 into slidable engagement with the inner surface of the roll shell 13. The shoe is shown as being rockably mounted on a rectangular piston 17, recessed within the center shaft and extending for substantially the length thereof, as in the aforementioned application of Edgar J. Justus, Ser. No. 339,998. The pressure shoe 16, the piston 17, the mounting for the piston in the center shaft 13, for extensible movement with respect thereto, and the fluid pressure means for applying fluid under pressure to the piston, to extend the piston with respect to the periphery of the center shaft form no part of the present invention, except insofar as they maintain a predetermined crown on the periphery of the deflection roll 11, and various conventional forms of deflecting means may be used in place of the pressure shoe 16 to maintain the periphery of the deflection roll 11 true or at a predetermined crown.

Figure 2:
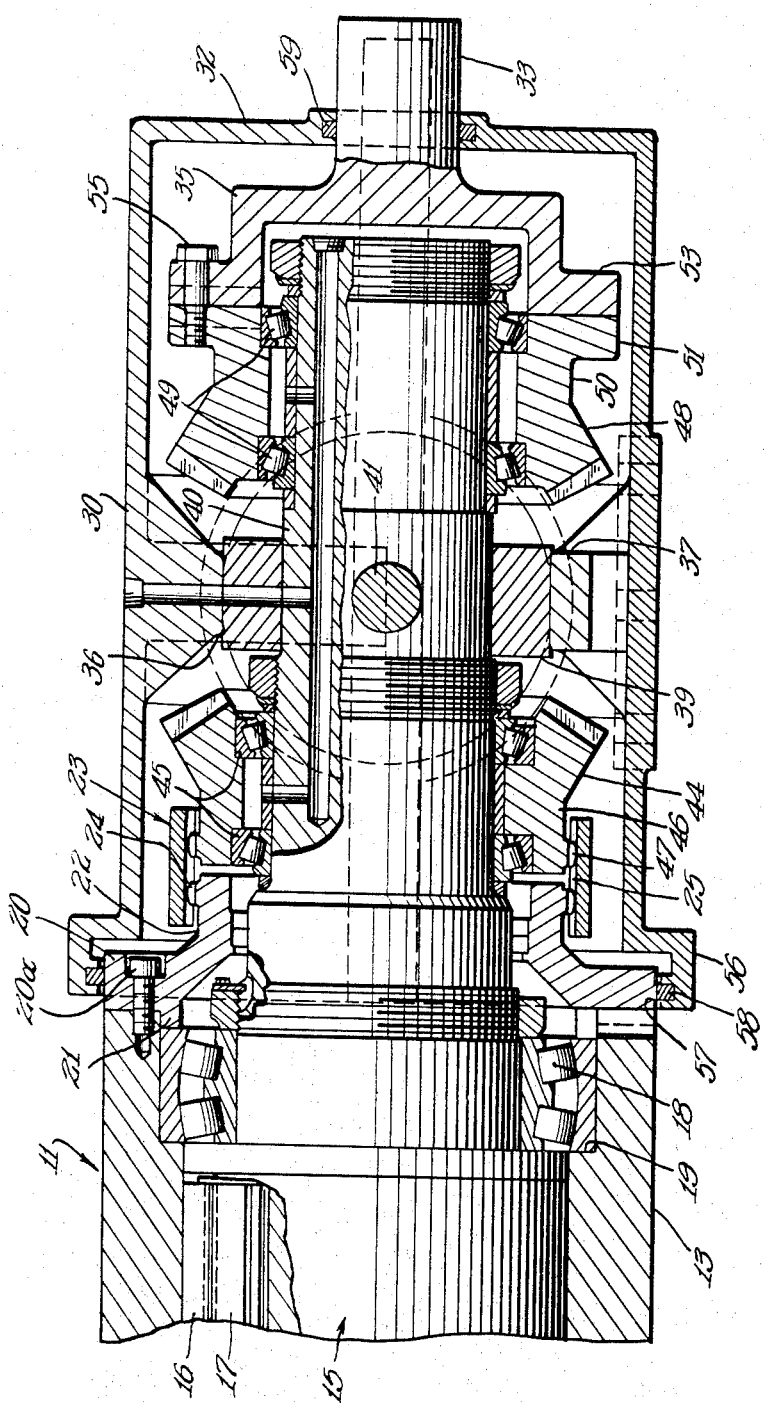
FIGURE 2 is a longitudinal sectional view taken through the roll and a portion of its center shaft, at the drive end of the roll.

The roll shell 13 is shown in FIGURE 2 as being supported at one end on the shaft 15 on a self-aligning bearing 18, herein shown as being a spherical roller bearing, but which may be of any conventional form. The opposite end of the roll shell 13 is supported on a similar bearing (not shown) in a similar manner. As herein shown, the outer race of the self-aligning bearing 18 is recessed within one end of the roll shell 13 and is retained in engagement with an abutment shoulder 19 formed in said roll shell, as by a drive and retainer ring 20 having an outer periphery forming a continuation of the outer periphery of the roll shell 13.

The drive and retainer ring 20 may be suitably sealed to the end of the roll shell and has a radially inwardly spaced axially extending flanged portion 21, extending along an inner peripheral portion of the roll shell into abutting engagement with the outer end of the outer race of the roll shell bearing 18. Machine or cap screws 20a, extending through the retainer ring and threaded in the end of the roll shell 13, are provided to retain the drive and retainer ring 20 to the end of the roll shell. The end of the drive and retainer ring 20 opposite from the flange 21 flares inwardly towards the center shaft 15 to a sleeve portion 22, the outer periphery of which is spaced radially outwardly of the shaft 15. The sleeve portion 22 may be the driven member of a flexible coupling 23 and has external drive teeth 24 meshed with corresponding internal teeth 25 formed in the ring of the coupling.

The opposite end of the roll shaft 15 from the coupling 23 extends outside of the roll shell 13 and is supported on a suitable support 26 on the outside of the roll shell (FIGURE 1) and forming a solid support for the roll shaft.

The end of the roll shaft 15 extending beyond the driven end of the roll shell 13 is shown in FIGURES 1 and 2 as being encased in a housing 30 supported on a pedestal 31. The pedestal 31 and housing 30 form a solid support for the roll shaft. The housing 30 is of a split construction and extends from the drive and retainer ring 20 along the roll shaft beyond the end thereof and has an outer end wall 32 through which extends a shaft 33 of a drive coupling 35.

The housing 30 has two internal facing support shoes 36 and 37 disposed intermediate the ends thereof and generally formed in the form of segments of a cylinder each being carried in one half of the housing. The facing arcuate faces of the cylindrical segments 36 and 37 are struck from an arc, the axis of which intersects the axis of rotation of the roll shell 13, and engage a cylindrical face of an annular support block 39, at the top and bottom sides of said support block.

The support block 39 may be pressed on a reduced diameter end portion 40 of the roll shaft 15 with a light press fit. The block 39 and reduced diameter end portion 40 of the center shaft 15 form a support for a transverse idler shaft 41 extending outwardly of the block 39. A bevel gear 42 is shown as being rotatably mounted on said shaft on roller thrust bearings 43.

The bevel gear 42 meshes with and drives a bevel gear 44 spaced between the inner side of the support block 39 and the roll shell 13. The bevel gear 44 is mounted on the reduced diameter portion of the roll shaft 15 on spaced roller thrust bearings 45. As shown in FIGURE 2, the bevel gear 44 has a hub 46 extending within the drive ring of the flexible coupling 23 and has coupling teeth 47 extending thereabout and outwardly therefrom and meshing with the internal teeth 25 of the flexible coupling, and thereby forms a drive for the drive and retainer 20 and roll shell 13.

On the opposite side of the annular support block 39 from the bevel gear 44 is a bevel gear 48 meshing with and driving the bevel gear 42. The bevel gear 48 is shown in FIGURE 2 as being rotatably mounted on the outer end portion of the reduced diameter portion of the center shaft 15 on axial thrust roller bearings 49, in a conventional manner. The bevel gear 48 has a hub 50 having a radial flange 51 extending radially outwardly therefrom and abutted by a radial flange 53 of the drive coupling 35. The coupling 35 may be secured to the flange 51, to drive the bevel gear 48, as by spaced machine or cap screws 55, shown in FIGURE 2 as extending through the flange 35 and as being threaded in the flange 51. The drive shaft 33 of the coupling 35, projecting through the end wall 31 of the housing 30 may be driven from a conventional drive coupling, or from any other suitable drive means.

The inner end of the housing 30 is shown as having a radially outwardly spaced sealing portion 56, extending thereabout, having a cylindrical inwardly facing axially facing wall portion 57 formed integrally therewith and extending closely adjacent the periphery of the drive and retainer ring 20. The wall portion 57 may have an inwardly facing sealing groove recessed therein, which may carry a conventional seal 58, to seal the space between the cylindrical wall portion 57 and the outer periphery of the drive and retainer ring 20, to retain lubricant to the housing 30. The end wall 32 may also have a sealing groove formed therein, containing a conventional seal 59 to seal said shaft to the end wall 32 of the housing.

It may be seen from the foregoing that a simple and compact drive has been provided for a roll shell, in which the roll shell is rotatably supported on a stationary center shaft and the drive is around the solid support for the center shaft in the form of a bevel gear drive connection, the drive from the bevel gear being through a flexible coupling, and the roll shell being rotatably mounted on the stationary center shaft 15 on self-aligning bearings. An efficient drive has thus been provided to the roll shell, where the shell may be crowned to counteract deflection thereof or to vary the nip pressures, while the center shaft is supported adjacent its opposite ends on solid supports, which is particularly adapted for an intermediate relatively small diameter driven roll of a calender stack, but which also may be adapted to a crown roll, and to various other forms of rolls, where control of deflection of the roll is a problem.

While I have herein shown and described one form in which the invention may be embodied, it may readily be understood that various variations and modifications in the invention may be attained without departing from the spirit and scope of the novel concepts thereof.

What is claimed is:

1. A controlled deflection roll forming a pressure nip with a second roll comprising:
   a cylindrical roll shell,
   a non-rotatable center shaft extending along the center of said roll shell and having nip correcting cooperation therewith,
   self-aligning bearing means rotatably supporting said roll shell on said center shaft at opposite ends of said roll shell,
   drive means for said roll shell including a first drive member rotatably journalled on said center shaft and having driving connection with said roll shell,
   a second drive member rotatably journalled on said center shaft and spaced axially of said first drive member,
   support means for said center shaft forming a solid support therefor, the support means for one end of said center shaft being disposed between said drive members, and
   a third drive member driving said second drive member from said first drive member around the support means for said one end of said center shaft.

2. A controlled deflection roll in accordance with claim 1, wherein the driving connection from the first drive member to the roll shell is a coupling sleeve.

3. A controlled deflection roll in accordance with claim 1,
   wherein the first drive member has a hub having external coupling teeth thereon,
   wherein the roll shell has a reduced diameter sleeve extending therefrom towards said hub,
   wherein said coupling sleeve has coupling teeth extending outwardly therefrom, and
   wherein a second coupling sleeve having internal coupling teeth meshing with said coupling teeth on said hub and said coupling sleeve, forms a flexible drive connection from said first drive member to said roll shell.

4. A controlled deflection roll in accordance with claim 1,
   wherein at least the first drive member and the second drive members are gears, and
   wherein the third drive member drivingly connects said gears around said support.

5. A controlled deflection roll in accordance with claim 1, wherein the three drive members are meshing bevel gears.

6. A controlled deflection roll in accordance with claim 1,
   wherein the first and second drive members are bevel gears rotatably journalled on said center shaft on opposite sides of said support,
   wherein the third drive member is an intermediate bevel gear connecting said bevel gears together, and
   wherein the driving connection from said first drive member to said roll shell comprises a coupling sleeve drivingly connecting the bevel gear forming said first drive member with an end of said roll shell.

7. A controlled deflection roll in accordance with claim 6,
   wherein an idler shaft is mounted on said center shaft and extends transversely thereof, and
   wherein said third bevel gear is journalled on said idler shaft.

8. A controlled deflection roll in accordance with claim 6, wherein the coupling sleeve has flexible driving engagement with said roll shell.

9. A controlled crown roll in accordance with claim 6, wherein the first drive member has a hub having external coupling teeth thereon,
wherein a coupling sleeve extends from said roll shell towards said hub and has external coupling teeth thereon, and
wherein a second coupling sleeve having internal coupling teeth meshing with said coupling teeth on said hub and on said first mentioned coupling sleeve forms a flexible drive connection from said first drive member to said roll shell.

References Cited

UNITED STATES PATENTS

| | | | |
|---|---|---|---|
| 3,147,650 | 9/1964 | Allen | 74—417 X |
| 3,290,897 | 12/1966 | Kuehn | 29—115 X |

FRED C. MATTERN, JR., *Primary Examiner.*

L. H. GERIN, *Assistant Examiner.*